Aug. 4, 1931.  H. CHRISMAN ET AL  1,816,957
FLUID METER
Original Filed Feb. 12, 1925   2 Sheets-Sheet 2
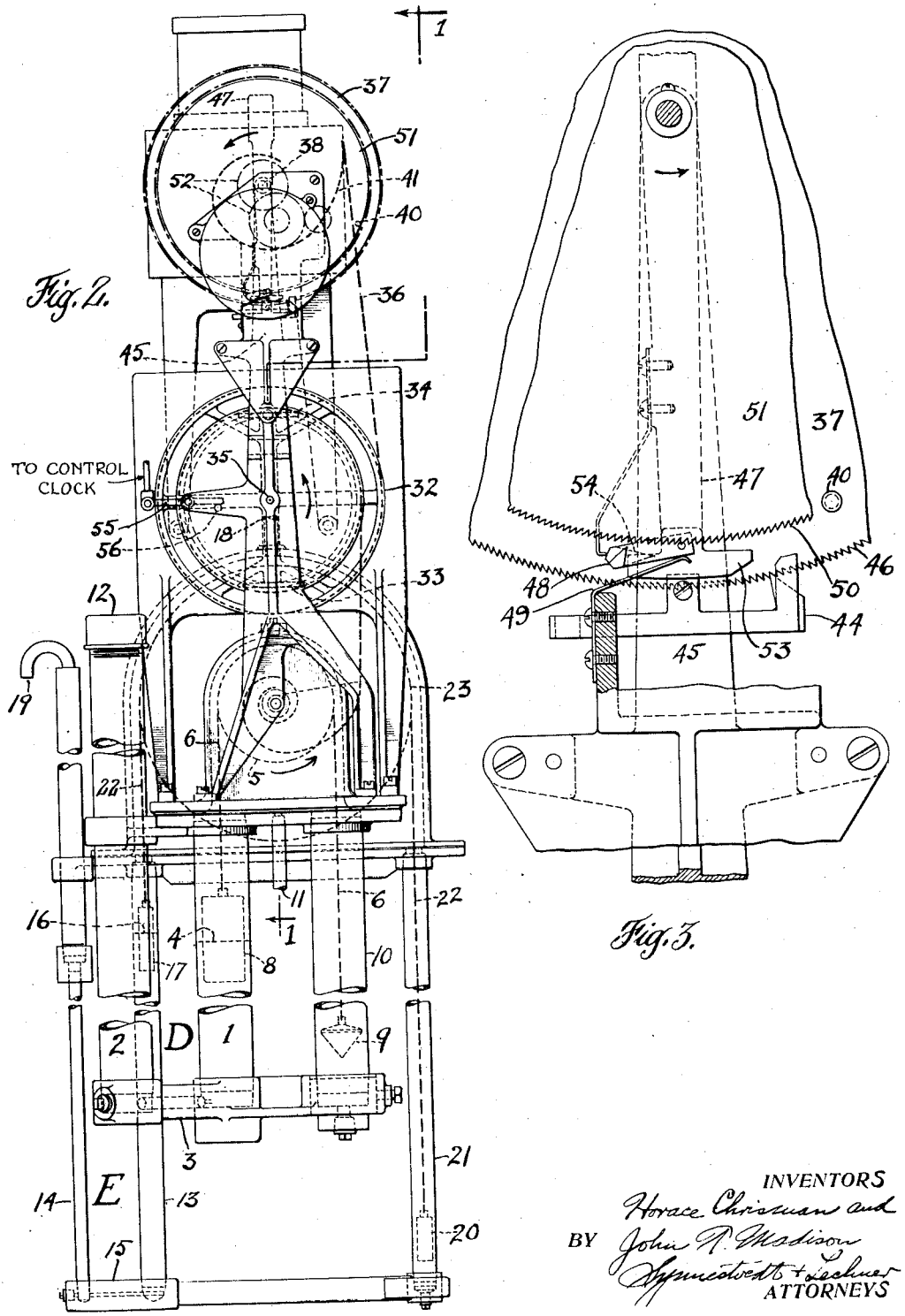
INVENTORS
Horace Chrisman and
BY John P. Madison
ATTORNEYS Patented Aug. 4, 1931

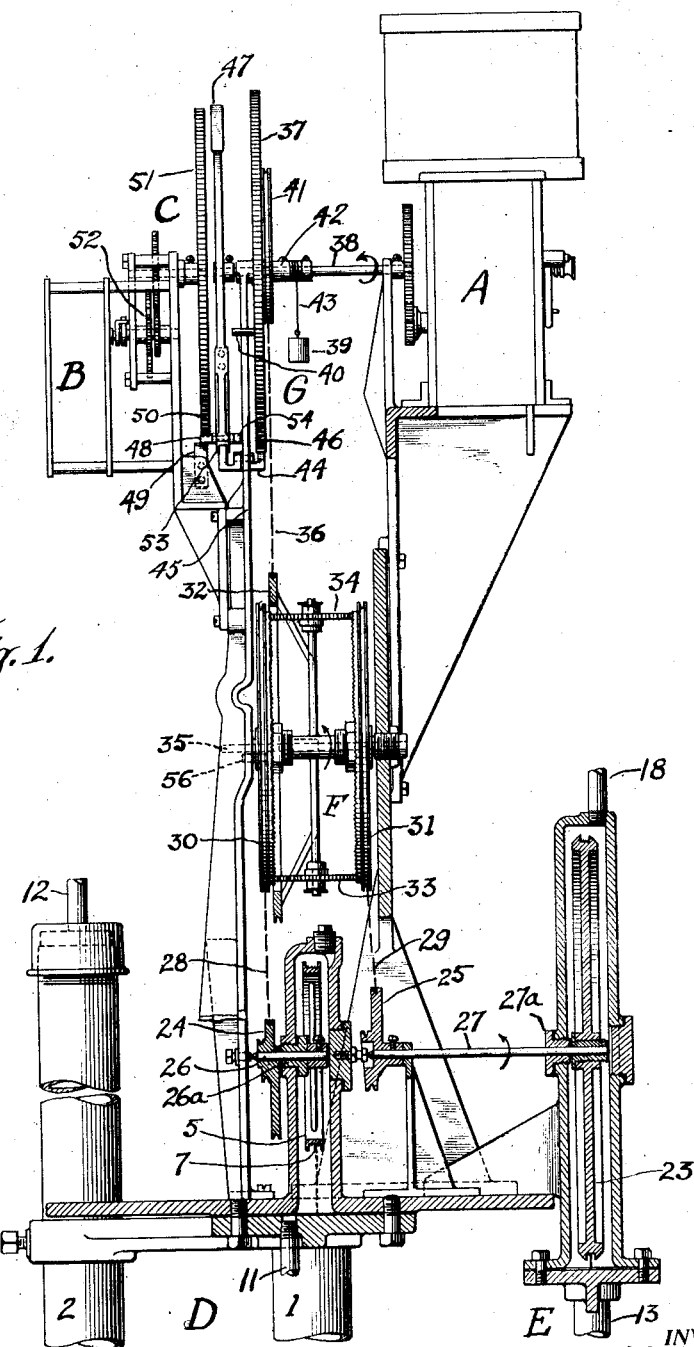

1,816,957

UNITED STATES PATENT OFFICE

HORACE CHRISMAN AND JOHN T. MADISON, OF PITTSBURGH, PENNSYLVANIA, ASSIGNORS, BY MESNE ASSIGNMENTS, TO PITTSBURGH EQUITABLE METER COMPANY, OF PITTSBURGH, PENNSYLVANIA, A CORPORATION OF PENNSYLVANIA

FLUID METER

Application filed February 12, 1925, Serial No. 8,601. Renewed November 30, 1928.

Our invention relates to meters and more particularly to that portion of a meter which performs the function of registration. It is applicable to orifice, Venturi, Pitot tube, and similar meters, and may well be styled a "direct reading orifice meter" as one of the primary advantages of the invention is the direct reproduction in figures with the elimination of all chart calculations and their attendant disadvantages.

The underlying principle of fluid meters is that the volume of fluid passed during a given period is equal to the product of the area through which it flows multiplied by the rate at which it flows.

Since the velocity at which the fluid flows is proportional to the difference in pressures across the orifice, an increasing flow for instance being caused either by decreasing the pressure on the down-stream side of the orifice or by increasing the pressure above the orifice, and as the difference in pressure is much more easily and accurately determined than the rate of flow, this difference in pressures is used instead of the velocity of flow in the commercial formula for these meters, which is, taking a gas meter for an example:

$$Q = C\sqrt{h(p+14.4)}$$

where
  $Q$ = quantity of gas passed in one hour,
  $C$ = hourly co-efficient of the orifice, or Pitot tube, etc. (obtained by experiment),
  $h$ = differential pressure in inches of water across the orifice,
  $p$ = static pressure in pounds per square inch (on the down-stream side of the orifice), and
  14.4 = the average atmospheric pressure at an elevation similar to that in territory where gas is usually sold, (an approximation assumed by the trade).

The usual types of these orifice, or Pitot tube, meters produce on charts line records of the static and differential pressures, and in order to find the quantity of gas or liquid passed within a given period it is necessary to make one or the other of the following two sets of calculations:

First. When the pressures are nearly constant, it is necessary to average the static and differential pressures, obtain from the table of pressure extensions the corresponding value of $$\sqrt{h(p+14.4)}$$

and multiply this value by the hourly co-efficient of the orifice, thus obtaining the volume passed in one hour, and so on.

Second. When the variation of either the static or differential pressures is too great to permit the securing of accurate results by the foregoing method, the following procedure must be carried out: Divide the chart into small periods. (Fifteen minutes is a common division). Make the complete calculation for each of these periods and add the resultant quantities to obtain the total. Should it be necessary to divide 24 hours into 15 minute periods (as is frequently the case) the entire calculation must be made 96 times for one day.

These calculations are extremely undesirable, and, in particular, for these reasons: First, that considerable expense is involved; second, that numerous opportunities are afforded for error in reading the charts, averaging the values and making the calculations; and third, that it is impossible in many cases, to read the charts to a degree of accuracy consistent with the degree of refinement of the most complete pressure extension tables which give the values for $$\sqrt{h(p+14.4)}$$

in steps of $\frac{1}{10}$ inches of water for the differential pressures and steps of $\frac{1}{2}$ lbs. (to 50 lbs.) and 1 lb. (above 50 lbs.) for the static pressures.

In all cases, the readings on the charts are only approximations offering numerous opportunities for cumulative errors.

While the foregoing procedure is that usually followed, we are aware that efforts have been made to overcome the difficulties enumerated, but little success has been heretofore achieved. Our invention is designed to overcome all these disadvantages.

Our apparatus takes readings much more frequently all of the time than is ever done at present under any conditions.

Its readings are extremely accurate.

It produces the resultant figures mechanically.

It eliminates all possibility of human error in calculation.

How these, and other advantages which will occur to those skilled in the art, are obtained through our invention will appear from the following description thereof, reference being had to the accompanying drawings, wherein Figure 1 is a side view of the apparatus, with certain parts in cross section, taken on the line 1—1 of Figure 2, but with the lower parts of the differential and static gauges omitted.

Figure 2 is a front elevation of the device with certain parts illustrated somewhat diagrammatically.

Figure 3 is a detail front view of the lock ratchet, driving ratchet and associated parts.

Certain general parts of the apparatus we designate as follows:

The reference letter A indicates a source of power, as shown in this case, a clock. B is a register, of conventional design, and per se not a part of our invention. C refers to the driving or transmission mechanism between the clock and register, taken as a whole, and includes the change gears 52 elsewhere mentioned. D represents in general the differential pressure gauge and E the static pressure gauge. The letter F applies to the calculating mechanism or multiplying device which receives its motion from the spiral cams 24 and 25 associated with the two gauges. The letter G represents the governor mechanism as a whole, which is the cooperating part between the power-driven register and the gauge-actuated calculating device or mechanism.

Referring now to Fig. 2, the differential gauge D is composed of a U tube with legs 1 and 2 and an intercommunicating bottom portion 3, this tube being filled with kerosene or some other liquid 4 suitable to vary the position of the float 8 to suit the values of the differential pressure. Over leg 1 of the U gauge is mounted a wheel 5 around which passes a cord or wire 6. This cord is fastened at its center to the wheel 5 to prevent its slipping and runs in a helical groove 7 (see Fig. 1) on the periphery of the wheel so that its radius about the center of the wheel is constant.

A float 8 is attached to one end of the cord 6 and drops into the leg 1 of the U gauge, and a counterweight 9 is attached to the other end which drops into a dry well 10. The weights of the float and counterweight are so proportioned that when the float is partly submerged in the liquid 4 in the U gauge, the float, counterweight and wheel are in equilibrium. The leg 1 of the U gauge, in which the float operates, is connected through pipe 11 (see Fig. 1) to the line on the upstream side of the orifice, and the other leg 2 is connected to the line on the down-stream side of the orifice through connection 12. Any change is the fluid level 4 (caused by variation in the differential pressure) will destroy the equilibrium of the float 8 and associated parts, and the float will rise or fall until it is again restored, thus causing the wheel 5 to rotate in direct proportion to such changes.

The static pressure gauge E is similar to the differential gauge both in construction and operation, having legs 13 and 14 and a connecting portion 15. The fluid 16 used, however, is mercury, or other liquid suitable to the static pressure which is usually much greater than the differential pressure.

The leg 13 of the U tube in which float 17 operates is connected to the line on the downstream side of the orifice through connection 18 (Fig. 1) and the other leg 14 is open to the atmosphere at 19. (See Fig. 2). The counterweight 20, which drops into dry well 21, is connected to the float 17 by the cord 22 passing around wheel 23 and transmitting to it the motion of the float and its counterweight in a manner similar to that of the differential gauge.

Associated with the wheels of the two gauges are two logarithmic cams 24 and 25. (See Fig. 1). These cams are rigidly mounted on the shafts 26 and 27 of the differential and static gauges respectively. These shafts pass through stuffing-boxes 26a and 27a. Cords 28 and 29 are attached to the inner ends of the cams and pass in grooves around their circumferences and thence to the grooves on the crown gear wheels 30 and 31, respectively.

The cam 24 on the differential gauge transmits to its crown gear wheel 30 the logarithmic value of the differential pressure expressed in terms of length and indicated by the amount of rotation of the crown gear wheel. The cam 25 on the static gauge transmits to its crown gear wheel 31 the logarithmic value of the absolute pressure $(p+14.4)$ expressed in the same manner and to the same scale as the logarithmic value of the differential pressure.

The calculating mechanism or multiplying device F is composed of the crown gear wheels 30 and 31 and a multiplier wheel 32 carrying gears 33 and 34. The multiplier wheel is located between the crown gear wheels and supported on the same shaft 35 with them, all three being free to turn on said shaft, their positions being governed by the gauges. The two gears 33 and 34 carried by the multiplier wheel 32 mesh with the crown gear wheels 30 and 31, thus causing the multiplier wheel to rotate in the same direction but only half as far as either crown gear wheel rotates. The rotation of the multiplier wheel is thus governed independently by the static and differential gauges and represents the logarithmic value of $$\sqrt{h(p+14.4)}.$$

Controlled by the multiplier wheel through its cord 36 is the governing mechanism G, designed to determine, in the proper proportion to the differential and static pressure values, the proportion of the time the register shall be driven in each separate cycle of the driving mechanism. This governing mechanism, as shown in our present embodiment of the invention, is of the following construction: A governor wheel 37 is supported on shaft 38, free to rotate about it but subject to the control of the multiplier wheel 32 and the counterweight 39. The governor wheel carries on one side the governor pin 40, and on the other side the governor cam 41, and an extended hub 42 having a helical groove in its surface. A cord or wire 43, bearing the weight 39, passes around this groove and is fastened to the hub.

The weight 39 is so arranged as to impart to the governor wheel a tendency to rotate in the direction it will turn when the value of $$\sqrt{h(p+14.4)}$$

is increasing. (This is also the same direction that the driving shaft 38 rotates, as indicated by the arrow.)

The cord 36 from the multiplier wheel is adapted to lie in a groove around the governor cam 41 and is attached to the outer end of the cam. (See Fig. 2.) This cam 41 is so proportioned that it causes the rotation of the governor wheel 37 to reflect the numerical value corresponding to the logarithmic value of $$\sqrt{h(p+14.4)}$$

as expressed by the multiplier wheel 32.

The position of the governor wheel is thus controlled, subject only to a certain ratchet locking device below described, by the counterweight and the pressure gauges, the counterweight tending to rotate it in one direction until stopped by the static and differential gauges which cause it to assume various positions proportional to the rate of flow, through the orifice, of the fluid to be metered.

The locking device for the governor wheel, which is for the purpose of maintaining the wheel in its position while the governor pin 40 is disconnecting the driving ratchet 48 from the registering mechanism, consists of a lock ratchet dog 44 mounted on a rigid part 45 of the frame and adapted to normally engage the ratchet teeth 46 on the periphery of the governor wheel, the dog 44 being biased toward engagement due to the fact that it is pivoted and the opposite end thereof is weighted. (See Figs. 1 and 3.)

The time element and source of power, which is the clock mechanism A, drives the shaft 38, on which is mounted the driving arm 47, in the direction indicated by the arrow. Figs. 1 and 3. Said arm carries on one end the driving ratchet dog 48, which, as shaft 38 rotates, comes in contact with a spring 49 which causes it to engage with the teeth 50 of the driving ratchet wheel 51 at the same fixed point on each revolution, thus driving the register B through the change gears 52. These gears 52 proportion the rotation of the register to the coefficient of the particular orifice.

The same end of the driving arm 47 which carries the dog 48 is lengthened circumferentially to form a cam or shoe 53, which, in each revolution of the arm 47 releases the lock ratchet dog 44 long enough for the governor wheel 37 to assume its proper position as determined by the static and differential gauges. As the cam 53 passes by, the lock ratchet again engages, due to its bias toward locking position, holding the governor wheel firmly in place so that the driving ratchet 48, as its face 54 comes in contact with governor pin 40, will be released and terminate the operation of the register by the clock for the rest of the cycle. (See Figs. 1 and 3, particularly the latter.)

To prevent the meter from registering the static pressure alone as a combined static and differential pressure when the differential pressure approaches zero, as it does when the fluid ceases to flow, a clock-stopping or disconnecting mechanism is provided. This consists of a lever 55, (Fig. 2) operating through connections (not shown) to the clock A, said lever being engaged by the pin 56 mounted on the differential crown gear wheel 30 to stop or disconnect the clock when said wheel 30 approaches the point representing zero differential pressure, or in other words, zero fluid flow. When the differential pressure again increases, the lever 55 is freed, releasing or reconnecting the clock and resuming registration.

Briefly stated, the operation of our apparatus is as follows, the drawings illustrating the meter with no pressure on the gauges:

When the valves connecting the gauges with the line are opened the up-stream pressure of the line is admitted through connection 11 to the high pressure side 1 of the differential gauge, and the down-stream pressure of the line is admitted through the connection 12 to the low pressure side 2 of the differential gauge and through the connection 18 to the high pressure side 13 of the static gauge, the other side 14 of the static gauge being open to the atmosphere at 19.

Owing to the partial obstruction in the line due to the orifice plate, the pressure in leg 1 of the differential gauge will be higher than in leg 2 whenever any gas is flowing. This difference in pressure causes the fluid level 4 to fall in proportion, and the float 8 falls in the same degree. (See Fig. 2). By its so doing the wheel 5 is caused by the cord 6 to rotate in the direction of the arrow, the counterweight 9 rising in proportion. Referring now to Fig. 1, the motion of the wheel 5 is transmitted by the shaft 26, which passes through the stuffing-box 26a, to the differential cam 24 and from there by cord 28 to crown gear wheel 30.

The static gauge operates in a similar manner by means of the fluid 16, float 17, cord 22, counterweight 20, wheel 23, shaft 27 and cam 25, transmitting its motion through cord 29 to crown gear wheel 31.

The existence of a small differential pressure is enough to permit a rotation of the crown gear wheel 30 sufficient to cause pin 56 to release lever 55 and start the rotation of the shaft 38 by the clock A.

The weight 39, which is suspended from the hub 42 of the governor wheel 37, imparts to the governor wheel a tendency to rotate in the same direction as the drive-shaft 38, indicated by the arrow. Rotation in this direction represents increasing values of static and differential pressure and larger volumes of fluid passing. This tendency is checked by the cord 36, controlling the governor from the multiplier wheel 32. The multiplier wheel is, in turn, checked by its associated calculating mechanism F, which, finally, is controlled by the gauges D and E.

The position of pin 40, carried by the governor wheel is thus controlled by the static and differential gauges, the counterweight 39 being permitted to pull the governor wheel ahead when a larger volume is passing through the meter, and the gauges D and E pulling it back when the volume passing decreases.

The register, driven from the clock through the shaft 38, arm 47, dog 48, ratchet wheel 51 and change gears 52 operates in each cycle of the driving mechanism only for that proportion of the time determined by the position of the governor pin 40, since registration starts periodically when the dog 48 is meshed with the teeth 50 of ratchet wheel 51 by the fixed spring 49, and stops when the upper face 54 of the dog 48 encounters the said governor pin. The readjustment of the governor pin by the two gauges is also of periodic occurrence since its locking ratchet 44 is disengaged once in every cycle of the driving mechanism by the shoe 53 on the end of arm 47 sufficiently long for such readjustment to take place.

The cycle of operations as just described continues until the value of the differential pressure falls so low as to cause pin 56 again to strike the lever 55, thus stopping or disconnecting the clock.

It is to be understood that the scope of our invention is not to be limited to the use of a particular kind of clock mechanism or a particular register. Nor is it to be limited to the particular type of pressure gauge illustrated. It may easily be conceived that different forms of these and other parts may well be used, according to the dictates of mechanical expediency, without departing from the spirit of this present invention.

However, the cycle of the governing mechanism as first described and as shown in the drawings is the preferred one, owing to certain detail advantages, the said advantages, however, having no bearing upon the principles involved.

What we claim, and desire to secure by Letters Patent, is:

1. A fluid meter comprising, in combination, a register actuated by a source of power, trip mechanism adapted to interrupt periodically the operation of the register for a period inversely proportional to the rate of fluid flow, and means actuating said trip mechanism by pressure changes of the fluid to be measured, said means comprising a differential gauge, a static gauge, and differential gearing between them and the trip mechanism.

2. A fluid meter comprising, in combination, an indicator, a source of power, transmission means interposed between them, a differential pressure gauge, a static pressure gauge, means associated with said gauges adapted to disconnect the transmission means, and means actuated by the source of power adapted to permit periodic adjustment by the gauges of the disconnecting means associated with said gauges.

3. A direct reading orifice meter comprising, in combination, a register, a source of power, disconnectible driving means interposed between them, a differential gauge, a static gauge, differential gearing adapted to translate the motions of the gauges into a single motion, means cooperating with said gearing adapted to disconnect the driving means at a point in its movement determined by the position of the gauges, and connecting means adapted to re-connect the driving means at a given point in each cycle of its movement.

4. A meter of the character described comprising, in combination, a differential gauge; a static gauge; a cam associated with each gauge; calculating mechanism operable by said cams; a governor wheel having a cam and a weight associated therewith, said wheel operable in one direction by the weight and in the other direction by action of the calculating mechanism on the last mentioned cam; locking means for the governor wheel; a clock mechanism; a member driven thereby; a register; means adapted to connect the register with the driven member; means carried by the driven member adapted to release the governor wheel lock; and trip means operable by the governor wheel to disengage the register from the driven member.

5. A meter of the character described comprising, in combination, a differential gauge; a static gauge; a cam associated with each gauge; calculating mechanism operable by said cams; a governor wheel having a cam and a weight associated therewith, said wheel operable in one direction by the weight and in the other direction by action of the calculating mechanism on the last mentioned cam; locking means for the governor wheel; a clock mechanism; a member driven thereby; a register; means adapted to connect the register with the driven member; means carried by the driven member adapted to release the governor wheel lock; trip means operable by the governor wheel to disengage the register from the driven member; and clock disconnecting means actuated by said differential gauge and operable by the dropping of the differential pressure substantially to zero.

6. A direct reading orifice meter comprising, in combination, a source of power; a member driven therefrom; a register; a transmission means therefor adapted to multiply the action of the driven member by the co-efficient of the orifice; connecting mechanism, adapted periodically to engage the register transmission with the driven member; a differential pressure gauge; a static pressure gauge; means associated with each gauge, adapted to produce the logarithmic value of their respective movements reduced to the same scale; calculating mechanism cooperating with the last mentioned means to obtain the resultant of their combined movements; a governor wheel; cam mechanism associated therewith actuated by the motion of the calculating mechanism and adapted to impart the numerical value of such motion to the governor wheel; locking mechanism for the governor wheel operable by the aforementioned driven member to release the governor wheel periodically; and trip mechanism operable by the governor wheel to release the connecting mechanism between the register transmission and the driven member.

7. A direct reading orifice meter comprising, in combination, a source of power; a member driven therefrom; a register; a transmission means therefor adapted to multiply the action of the driven member by the co-efficient of the orifice; connecting mechanism, adapted periodically to engage the register transmission with the driven member; a differential pressure gauge; a static pressure gauge; means associated with each gauge, adapted to produce the logarithmic value of their respective movements reduced to the same scale; calculating mechanism cooperating with the last mentioned means to obtain the resultant of their combined movements; a governor wheel; cam mechanism associated therewith actuated by the motion of the calculating mechanism and adapted to impart the numerical value of such motion to the governor wheel; locking mechanism for the governor wheel operable by the aforementioned driven member to release the governor wheel periodically; trip mechanism operable by the governor wheel to release the connecting mechanism between the register transmission and the driven member; and clock-releasing mechanism actuated by movement of the differential gauge to substantially zero differential pressure.

8. An orifice meter of the character described, comprising in combination, a differential pressure gauge, a spiral cam associated therewith, a static pressure gauge, a second spiral cam associated therewith, said cams being constructed with their respective curved faces to reproduce to the same scale the logarithmic value of the movement of the gauges expressed in terms of length, a crown gear operable from each cam, differential gearing actuated by said crown gears, trip mechanism positioned by said gearing, a register, multiplier gears therefor proportioned to the co-efficient of the orifice, motor means, and periodically-operating disconnectible transmission means between the motor means and multiplier gears, said trip mechanism being adapted to disconnect said transmission means in each cycle of movement of said motor means.

9. An orifice meter of the character described, comprising, in combination, a differential pressure gauge, a spiral cam associated therewith, a static pressure gauge, a second spiral cam associated therewith, said cams being constructed with their respective curved faces to reproduce to the same scale the logarithmic value of the movement of the gauges expressed in terms of length, a crown gear operable from each cam, differential gearing actuated by said crown gears, trip mechanism positioned by said gearing, a register, multiplier gears therefor proportioned to the co-efficient of the orifice, motor means, disconnectible transmission means between the motor means and multiplier gears, and means adapted to complete the transmission connection periodically in each cycle of movement of said motor means, said trip mechanism being adapted to disconnect said transmission in each cycle of the motor means.

10. A mechanical direct reading fluid meter comprising a member movable in direct accordance with the logarithmic value variations in differential pressure across an orifice in a conduit, a member movable in direct accordance with the logarithmic value of variations in static pressure in said conduit, mechanism to add said lagarithmic values and halve the sum of said values, an element carrying a stop operatively connected to said mechanism for movement in accordance with the antilogarithm of half the sum of said logarithmic values, means movable periodically an amount determined by the position of said stop, a register, and mechanism operatively connecting said last named means and said register.

11. A mechanical direct reading fluid meter comprising a member movable in direct accordance with the logarithmic value variations in differential pressure across an orifice in a conduit, a member movable in direct accordance with the logarithmic value of variations in static pressure in said conduit, mechanism to add said logarithmic values and halve the sum of said values, an element carrying a stop operatively connected to said mechanism for movement in accordance with the antilogarithm of half the sum of said logarithmic values, a clock mechanism, an element means to periodically drive said element by said clock mechanism, said element being released from said clock mechanism by said stop, a register, and mechanism operatively connecting said element and register.

12. A mechanical direct reading fluid meter comprising a member movable in direct accordance with the logarithmic value variations in differential pressure across an orifice in a conduit, a member movable in direct accordance with the logarithmic value of variations in static pressure in said conduit, mechanism to add said logarithmic values and halve the sum of said values, an element operatively connected to said mechanism for movement in accordance with the antilogarithm of half the sum of said logarithmic values, a register, and means to actuate said register, said last named means being controlled in amount by said element, whereby said register is moved in accordance with the antilogarithm of half the sum of said logarithmic values.

13. A mechanical direct reading fluid meter comprising a float movable in accordance with variations in differential pressure across an orifice, a float movable in accordance with variations in static pressure, a member operatively driven by each of said floats in accordance with the logarithms of the values of pressures causing movement of said floats, mechanism to add the movements of said members and halve the result; mechanism movable in accordance with the antilogarithm of said halved result, a stop actuated by said last named mechanism, a register, and means to periodically actuate said register, the extent of movement of said last named means being controlled by the position of said stop.

14. A mechanical direct reading fluid meter comprising means movable in accordance with variations in differential pressure across an orifice, means movable in accordance with variations in static pressure, a member operatively driven by each of said means in accordance with the logarithms of the values of pressures causing movement of said floats, mechanism to add the movements of said members and halve the result, mechanism movable in accordance with the antilogarithm of said halved result, a stop actuated by said last named mechanism, a register, and means including change gears to periodically actuate said register in accordance with the constant of the meter, said last named means being controlled by the position of said stop.

15. A mechanical direct reading fluid meter comprising mechanism to automatically cause movement of a member carrying a stop in accordance with the variations in the antilogarithm of half the sum of the logarithmic values of the differential and static pressures of fluid flowing through a conduit provided with a restriction, a register, and means to periodically actuate said register, said last named means being controlled by the position of said stop.

16. A mechanical direct reading fluid meter comprising mechanism to automatically cause movement of a member carrying a stop in accordance with the variations in the antilogarithm of half the sum of the logarithmic values of the differential and static pressures of fluid flowing through a conduit provided with a restriction, a register, a clock mechanism, and a member periodically actuated by said clock mechanism and operatively connected to said register, said member being disconnected from said clock mechanism after an amount determined by the position of said stop.

In testimony whereof, we have hereunto signed our names.

HORACE CHRISMAN.
JOHN T. MADISON.